United States Patent Office 2,885,456
Patented May 5, 1959

2,885,456

COLD COAGULABLE FOAMED RUBBER LATEX AND SPONGE THEREFROM AND PROCESS FOR MAKING SAME

Stewart R. Ogilby, Hudson, Ohio, assignor to The Goodyear Tire & Rubber Company, Akron, Ohio, a corporation of Ohio No Drawing. Application November 3, 1954
Serial No. 466,667

3 Claims. (Cl. 260—723)

This invention relates to cold coagulable foamed rubber latex containing a solution of an inorganic substance capable of becoming insoluble at reduced temperatures to form an irreversible copious precipitate, and to a method for making a foam rubber latex sponge which comprises subjecting the foamed rubber latex to a reduced temperature and then vulcanizing the latex so treated.

Rubber latex does not tend to readily coagulate in the cold, particularly at high pH levels, i.e., above about 9.5, and when coagulation does take place a weak gel is usually formed. The use of strong coagulants, such as alcohols or acids, to overcome the disadvantages of weak gels is not entirely satisfactory for commercial production, particularly where articles are formed in a closed mold. The known processes of immersing the frozen foamed rubber latex in a separate coagulating medium or injecting a gas coagulant into a mold filled with foam, are not readily adapted to efficient continuous production methods.

It is an object of this invention to insure the proper coagulation of foamed latex at reduced temperatures, i.e., 32° F. or lower, and at the same time form an improved coagulant in a foamed condition.

It has now been discovered that this object may be accomplished by adding to the rubber latex a solution of an inorganic substance which is capable of becoming insoluble at reduced temperatures to form an irreversible and copious precipitate.

Any inorganic substance which is capable of becoming insoluble at temperatures below room temperature, for example, at a temperature of about 32° F. or lower, and particularly under temperature conditions which brings about the formation of a very copious precipitate, may be used in this invention. A preferred substance is silicic acid, and particularly silicic acid resulting from the treatment of sodium silicate with a cation exchange resin which function to replace the sodium molecule of sodium silicate with hydrogen to form a clear solution of silicic acid. Under these conditions of formation, the resulting solution may have a pH of about 9 or 10 because of the presence of traces of sodium silicate. Other inorganic substances which are capable of becoming insoluble at reduced temperatures to form an irreversible copious precipitate are the dialkyl amine silicates, such as dimethyl amine silicate and diethyl amine silicate, which are formed by passing sodium silicate through a dimethyl amine or diethyl amine treated cation exchange resin.

Any coagulable rubber latex may be used in this invention. Natural rubber latex is particularly useful and any synthetic rubber latex, including the rubbery copolymers resulting from the polymerization of a mixture containing a major proportion of butadiene and a minor proportion of styrene reacted under hot conditions, i.e., at a temperature of about 120° F. or under cold conditions, i.e., at about 41° F., may be used. These rubbery copolymers of butadiene and styrene are generally referred to as a GR–S type of latex. Natural rubber latex may be used alone or in combination with synthetic rubber latices, including the GR–S type of latex or polybutadiene latex in ratios of the natural rubber latex to the synthetic rubber latex ranging from 90/10 to 10/90, preferably in ranges of from 40/60 to 60/40.

The rubber latex to be used in making the cold coagulable foamed composition of this invention may contain any of the well-known compounding ingredients commonly employed in latex compounding, such as vulcanizing agents, as for example, sulfur; vulcanization accelerators, such as mercaptobenzothiazole and zinc dibutyl dithiocarbamate; antioxidants, such as symmetrical dibeta naphthylparaphenylene diamine; fillers, such as cotton linters or glass fibers; reinforcing agents, such as clay or phenol formaldehyde resins; latex coagulation stabilizers, also known as frothing agents, such as aryl or alkyl sulfates, aryl or alkyl sulfonates, Saponin, and the salts of polyalkylenepolyamines with fatty acids; and plasticizers, such as vegetable oils or waxes. These compounding ingredients are used in amounts in accordance with conventional latex compounding techniques. It is preferred to keep the fixed alkali bases or the fixed alkali salts of weak acids at a minimum amount. The following example is illustrative of this invention:

*Example 1*

The following general formulation was used in making cold coagulable foamed latex:

|  | Parts |
|---|---|
| Rubber latex | 100 |
| Curing agent | 2 to 5 |
| Vulcanization accelerator | 1 to 10 |
| Zinc oxide | 5 to 15 |
| Froth stabilizing agent | 1 to 5 |
| Irreversible precipitable inorganic substance | 5 to 50 |

The above components are blended together by first adding to the rubber latex, which is maintained at a high pH level, i.e. about 9.5 or above, to prevent coagulation at normal room temperatures, i.e. about 70° F., the vulcanization accelerators together with the curing agent followed by the addition of a solution of an inorganic substance capable of becoming insoluble at reduced temperatures to form an irreversible copious precipitate, for example, silicic acid as described above, after which zinc oxide is then added. The resulting compounded rubber latex is then subjected to high speed mixing with any conventional means used for introducing air into the mixture. During this mixing and foaming operation, the froth stabilizing agent is added. Although this order of mixing is preferred, it is not important nor necessary to mix in this order.

After the compounded latex has been formed to the desired density, the froth is poured into a suitable mold or otherwise shaped as desired, and coagulated by reducing the temperature of the froth below 32° F. After the froth has become frozen and coagulated, it is warmed to about 165° F. in air and then cured, using conventional conditions of time and temperatures.

The resulting sponge is free of loose skin, has a very uniform cellular texture, and is free of breakdown between the cell walls.

The following example is a specific embodiment of the general formulation set forth in Example 1:

*Example 2*

|  | Parts |
|---|---|
| Natural rubber latex (60% solids and free of ammonia) | 154.32 |
| Triethylene tetramine (50% solution) | 2 |
| Ethyl zimate (50% dispersion) | 2 |
| Sulfur (5% dispersion) | 4.5 |
| Zinc Captax (40% dispersion) | 3.75 |
| Aqueous colloidal silica (18% solution of silicic acid | 22.2 |
| Zinc oxide (50% dispersion) | 10 |
| Aquarex D (20% solution) | 2.5 |

The various components of the formulation were mixed in the order listed, with the exception that the Aquarex D was added while the blend of the other components was being frothed in a 5-quart bowl by means of a high speed wire whip. The resulting foam was poured into a conventional furniture cushion mold and coagulated by placing in a Dry Ice chest, care being taken to exclude $CO_2$ penetration of the mold. After 35 minutes, the mold was warmed in air at 15° F. and then cured in the presence of saturated steam for 15 minutes at 250° F. The resulting cushion had no loose skin, and a very uniform cellular structure of the type possessed by the foamed latex prior to gelation.

It has been discovered that the cold sensitiveness of the formulation set forth in Example 1 may be improved by adding a polyamine to the latex. The combination of the polyamine and the solution of an inorganic substance capable of becoming insoluble at reduced temperatures, is preferred in forming the irreversible copious precipitate rather than the use of the said inorganic substance alone. Specific substances useful in combination with the said inorganic substances, such as silicic acid, are the organic polyamines, particularly triethylene tetramine, as particularly described in U.S. Patent 2,359,698, and ethylene diamine. Other materials that function in a similar manner, as described for the polyamines, are the amino acids, such as glycene, and the proteins, such as glue and casein, which hydrolize to form amino acids.

It is preferred to use the Aquarex D type of foam stabilizers in place of the fixed alkali soaps or the ammonia soaps, since these soaps tend to interfere with the cold sensitizing action imparted to the latex by the use of a solution of an inorganic substance capable of becoming insoluble at reduced temperatures, such as silicic acid used alone or in combination with a polyamine. Aquarex D is a latex stabilizer selected from that class of stabilizers known as a sodium salt of a sulfonated mono ester of a higher fatty alcohol, including the lauryl and myristyl alcohols.

The cold sensitized foamed rubber latex of this invention can be used for the cold molding of articles in the same general type of molds now used for the coagulation of foamed latex articles using heat.

The unfrothed latex composition of this invention has been discovered to be less sensitive to coagulation than after frothing in the cold when used under production conditions.

While certain representative embodiments and details have been shown for the purpose of illustrating the invention, it will be apparent to those skilled in this art that various changes and modifications may be made therein without departing from the spirit or scope of the invention.

I claim:

1. A cold coagulable foamed natural rubber latex containing 5 to 50 parts of colloidal silica dispersed therein, and 1 to 5 parts of a composition selected from the group consisting of organic polyamines and amino acids, all parts being per 100 parts of latex.

2. A cold coagulable foamed natural rubber latex containing about 4 parts of colloidal silica dispersed in said rubber latex, and about 2 parts of triethylene tetramine all parts being 100 parts of latex.

3. The method of forming foamed rubber latex sponge which comprises compounding a rubber latex selected from at least one of the group consisting of natural rubber latex, a rubbery copolymer latex resulting from the polymerization of a mixture containing a major proportion of butadiene and a minor proportion of styrene, and polybutadiene latex, with 5 to 50 parts of colloidal silica per 100 parts of latex, foaming said latex, subjecting the foamed latex to a temperature below about 32° F., and then vulcanizing the latex.

References Cited in the file of this patent

UNITED STATES PATENTS

| | | |
|---|---|---|
| 1,762,729 | McGavack | June 10, 1930 |
| 2,359,698 | Uhlig | Oct. 3, 1944 |
| 2,432,353 | Talalay | Dec. 9, 1947 |
| 2,760,941 | Iler et al. | Aug. 28, 1956 |

UNITED STATES PATENT OFFICE
CERTIFICATE OF CORRECTION

Patent No. 2,885,456                                                    May 5, 1959

Stewart R. Ogilby

It is hereby certified that error appears in the printed specification of the above numbered patent requiring correction and that the said Letters Patent should read as corrected below.

Column 2, line 48, for "formed" read — foamed —; column 3, line 9, for "15° F." read — 165° F. —.

Signed and sealed this 8th day of September 1959.

(SEAL)
Attest:

KARL H. AXLINE                                                    ROBERT C. WATSON
Attesting Officer                                               Commissioner of Patents